United States Patent

[11] 3,614,077

| [72] | Inventors | Marvin J. Blackburn<br>Pasadena;<br>Harry E. Criner, Walnut, both of Calif. |
|---|---|---|
| [21] | Appl. No. | 8,872 |
| [22] | Filed | Feb. 5, 1970 |
| [45] | Patented | Oct. 19, 1971 |
| [73] | Assignee | Vernon Tool Company<br>Alhambra, Calif. |

[54] UNIVERSAL PIPE CUTTING AND HANDLING MACHINE
31 Claims, 6 Drawing Figs.

[52] U.S. Cl. .................................................. 266/23 N,
228/48, 266/23 NN
[51] Int. Cl. .................................................. B23K 7/04
[50] Field of Search .................................................. 266/23 N,
23 NN, 23 B, 23 E, 23 K, 23 L; 228/48, 47, 49

[56] References Cited
UNITED STATES PATENTS

| 1,907,702 | 5/1933 | Anderson | 228/48 X |
| 2,995,353 | 8/1961 | Booth et al. | 266/23 NN |
| 3,430,938 | 3/1969 | Blackburn | 266/23 N |
| 3,443,804 | 5/1969 | Roder | 266/23 K |

Primary Examiner—Frank T. Yost
Attorney—Sellers and Brace

ABSTRACT: A one-man universal pipe mitering, bevelling, cutting and contouring machine, including power means for feeding uncut pipe therefrom to a classifying station, all operable by one man from a control console readily movable between two principal cutting stations. One cutting station is equipped with cutting torch means for making straight or bevelled cuts normal to the pipe axis and the other is equipped with contour generating mechanism for guiding the cutting torch means while making any of a wide variety of cuts in other than a normal plane and suitable for use in joining together two misaligned pipes. The machine includes two sets of power-driven rollers, one for rotating the pipe and one for moving the pipe axially forwardly or rearwardly as well as power means for raising the pipe off the pipe rotating rollers while being positioned opposite a selected cutting torch. Power-driven conveyor means delivers finished pipe to a classifying station and discharges the pipe to a selected receiving zone lengthwise of the conveyor and disposed to either side of the conveyor following which power means automatically restores the conveyor to its normal transporting position.

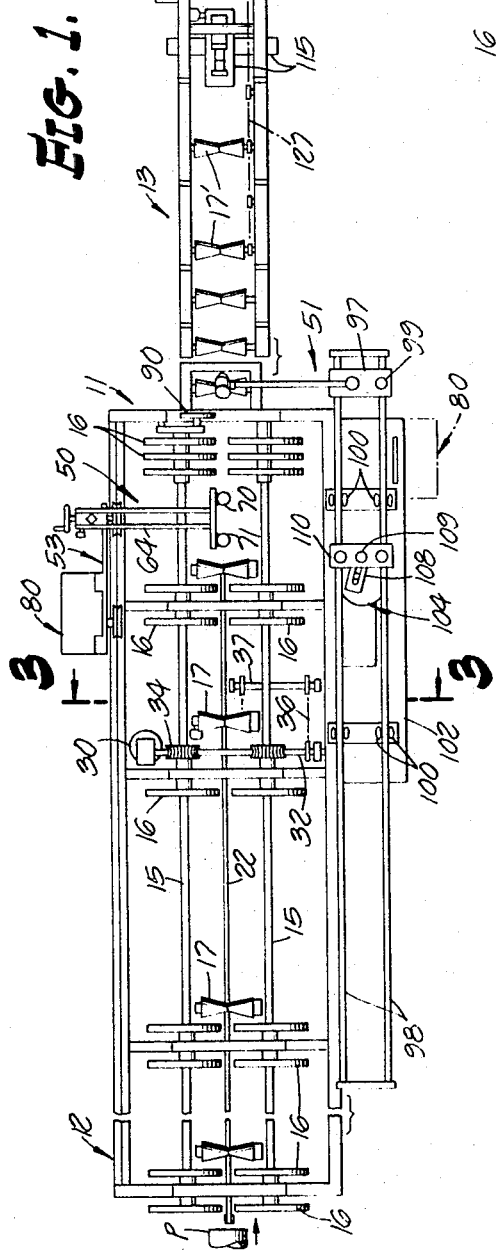

INVENTORS.
MARVIN J. BLACKBURN
HARRY E. CRINER
BY
ATTORNEYS

UNIVERSAL PIPE CUTTING AND HANDLING MACHINE

This invention relates to machines for cutting pipe using flame or other cutting devices, and more particularly to a highly versatile universal pipe mitering and bevelling machine operable by one man from a control console and enabling the operator to make straight, bevelled, mitered and contour cuts with equal facility from an operating position directly adjacent the cutting operation and including power feed means for the pipe as well as power means for classifying the finished product.

Flame cutting machines for subdividing and shaping metal pipe have been proposed heretofore in a wide variety of designs and embodying various operating principles. Some of these machines include geometric contouring mechanisms for guiding the cutting torch through a desired path correlated with the rotation of the pipe about its axis to form the end of the pipe or a cutout between its ends suitably shaped to make a welded junction with another pipe lying at an angle thereto. However, these prior pipe-cutting machines are subject to numerous shortcomings and disadvantages sought to be eliminated by the present invention. For example, prior machines are notoriously lacking in their proficiency and adaptability to make both straight and contour cuts, prior constructions being particularly suitable and efficient in making one or the other type of cut. This has necessitated the procurement, operation and servicing of separate machines for making the two different classes of cuts, as well as the costly transfer of pipe from one machine to the other whenever both types of cuts are required in a particular piece of pipe.

Another serious shortcomings of prior pipe-cutting machines has been their complexity and particularly the need for an operating crew of two or more men to man the various controls and to perform the various operational requirements. This not only involves needless loss of time in coordinating the tasks of the crew members but adds to the operating costs and increases the opportunities for errors and the number of rejects. Prior cutting machines are also characterized by their lack of satisfactory, easily operated facilities for handling pipe between cutting operations, including means for moving long lengths of pipe into cutting position, advancing it to or fro from one cutting position to another, and means for carrying away the finished product and for automatically delivering each to a desired classification area under the control of the machine operator.

To avoid the foregoing and numerous other shortcomings of prior practice there is provided by this invention an improved cutting machine of an unusually versatile character having multiple cutting stations each readily shiftable lengthwise of the machine. A single lightweight readily movable control console having flexible operating connections with the machine components can be moved at the user's option for use opposite the various cutting stations. Irrespective of the position selected for the use of the control console, all controls of the various components of the machine then required to be operated are within easy reach of the single machine operator while stationed at the control console. The operator not only has the most advantageous view of the particular cutting operation then in progress but has convenient access to all controls for which he has any need.

The machine includes power means for operating two sets of rollers one of which is effective to rotate the pipe about its axis and the other of which is effective to raise and lower the pipe as well as move it axially to and past the several cuttings stations as well as to deliver the finished product to the different classified delivery points. The latter are located lengthwise of the carry away conveyor and to either side thereof to any one of which the pipe can be discharged at the option of the operator while stationed at the control console. Another feature adding greatly to the efficiency of the machine is the provision of a power-operated stop in association with measuring means. When the stop is located in its extended position under control means provided at the control console, the operator is enabled to shift the pipe lengthwise of the machine until engaging the stop and then utilize a measuring scale facility along the side of the machine to accurately position the cutting torch for the next cutting operation.

It is therefore a primary object of the present invention to provide an improved universal pipe-cutting machine useful in making a wide variety of straight, mitered, bevelled, and contoured cuts.

Another object of the invention is the provision of a universal pipe-cutting machine for making straight and/or geometric cuts with a one-man crew utilizing a control console readily movable to the most advantageous position for each particular cut.

Another object of the invention is the provision of a fully power-operated pipe-cutting machine operable by one man and including power control means for feeding pipe stock to and past the cutting station and for delivering cut pipe to a selected one of several classification areas.

Another object of the invention is the provision of a pipe-cutting machine equipped with pipe-rotating means and power means for moving the pipe out of contact with the rotating means while power-propelling the pipe in either direction at any selected speed, and including means for deactivating the power-propelling means while the pipe is position to be rotated.

Another object of the invention is the provision of a pipe-cutting machine having two sets of cutting torches each independently movable to any selected cutting station and including a common control console readily movable to an operating position associated with each torch means.

These and other more specific objects will appear upon reading the following specification and claims and upon considering in connection therewith the attached drawing to which they relate.

Referring now to the drawing in which a preferred embodiment of the invention is illustrated:

FIG. 1 is a generally schematic plan view showing the principal components of the machine in their operative relationship to one another but with major sections of the supply and discharging conveyors omitted;

FIG. 2 is a schematic view showing details of the common power drive interconnecting the pipe-rotating rollers, the pipe feed rollers and the geometric contour guide mechanism for one cutting torch assembly;

FIG. 3 is a vertical sectional view on an enlarged scale taken crosswise of the forward end of FIG. 2 and showing details of the pipe-elevating rollers relative to the pipe-rotating rollers;

Figure 5:
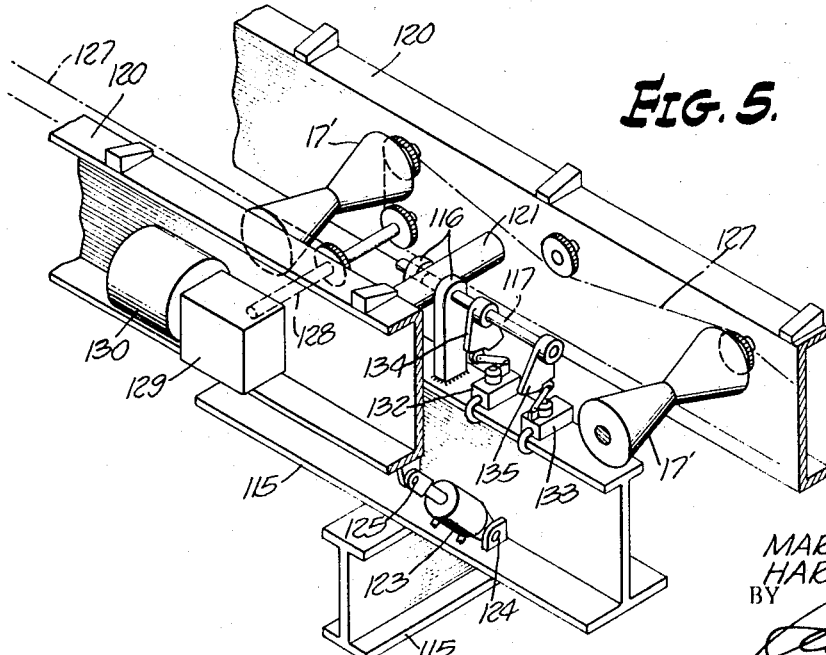
Figure 6:
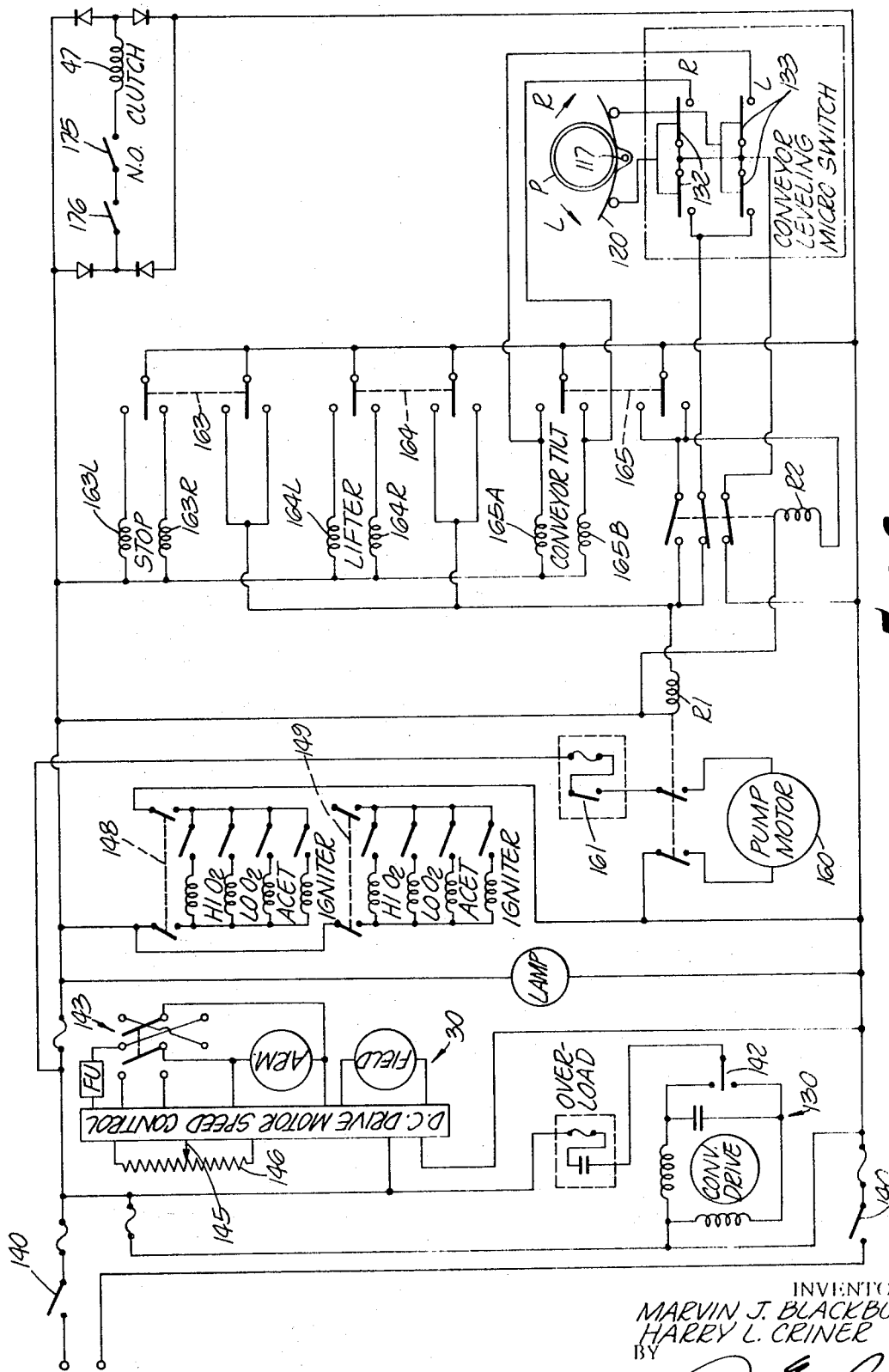

FIG. 5 is a fragmentary perspective view of a portion of the classifying conveyor showing the power means for tilting the conveyor and the microswitch means employed to return the conveyor to a level operating position after discharging cut pipe to a selected classification area; and FIG. 6 is a schematic view of the electrical system for controlling both the electrical and hydraulic components of the machine.

Referring initially more particularly to FIG. 1, there is shown a preferred embodiment of the invention pipe-cutting machine, designated generally 10, having an elongated main frame 11. Pipe in stock length is fed forwardly on a power feed conveyor subassembly 12 and a cut pipe delivery and classification conveyor 13 extends to the right from the discharge end of main frame 11. Both the supply and discharge conveyor subassemblies may be of any suitable length and the latter extends past one or more classification areas to either side thereof. The pipe-cutting stations are located centrally of the machine intermediate the forward end of the supply conveyor 12 and the rear end of the discharge conveyor 13. The latter is provided with its own power drive controlled through a flexible control cable connectable with the main control console as will be described presently. Although the supply conveyor 12 is preferably constructed separately from the main cutting machine for convenience in manufacture and shipping, it is thereafter secured to the inlet end of the cutting machine proper and is equipped with pipe rotating and feeding rollers driven in synchronism with those of the main cutting machine.

Extending lengthwise of the cutting machine are shafts 15, 15 each having secured thereto a multiplicity of rollers 16 between which the pipe rests while being rotated and cut. A second set of rollers 17 extend horizontally crosswise of the machine and are supported on the outer ends of pivoting brackets 18 (FIG. 2) having their lower ends journaled to a shaft 19 having its ends mounted in pillow boxes 20 secured to frame 11 (FIG. 3). When brackets 18 are pivoted to their upright position, as shown in full lines in FIG. 3, pipe P is supported in a raised position out of contact with the pipe-rotating rollers 16, 16. However, when brackets 18 are rotated forwardly through a small arc, rollers 17 are lowered out of contact with the pipe leaving the latter in supporting contact on the pipe-rotating rollers 16, 16.

The means for swinging feed rollers 17 about the axis of their supporting shafts 19 will be best understood by reference to FIGS. 2 and 3. As is there shown, each of the roller-supporting brackets 18 is pivotally connected by pins 23 to a common operating bar 22 extending lengthwise of the machine. This bar 22 is reciprocal lengthwise thereof by a double action hydraulic cylinder 25 pivoted to the main frame and having its piston rod 26 connected to a lever 27 pivoted by pin 28 to main frame 11. As will be evident from a consideration of FIG. 2, movement of the power piston to the left shifts bar 22 to the right to elevate roller 17, whereas movement of the piston in the opposite direction pivots rollers 17 counterclockwise to their retracted position leaving the pipe supported on the pipe-rotating rollers 16.

The power drive for the two sets of rollers 16, 17 is illustrated in FIG. 2 and includes a reversible variable speed direct current motor 30 connected through speed reduction means 31 to a main drive shaft 32 extending crosswise of main frame 11. Secured to shaft 32 are a pair of worms 33 engaging a respective worm gear 34 fixed to each of the pipe-rotating shafts 15 and effective to drive these shafts in the same direction. Shaft 32 is also connected by chain 36, shaft 37, and chain 38 to drive the nearest one of shafts 19 on which the pipe raising brackets 18 are supported. A long roller chain 40 passes lengthwise of the machine phase each of the roller-supporting brackets 18 of pipe supply conveyor 12 and of the main pipe-cutting machine and meshes with sprockets 41 fixed to some but not necessarily all of the shafts 19 associated with a respective pipe raising roller 17, it being understood that some of rollers 19 need not be power driven. Chain 40 passes over various idling sprockets 42 disposed below each of the sprockets 41 in the manner indicated in FIG. 2. Also fixed to each of the driven ones of shafts 19 is a sprocket 44 driving a chain 45 operating to rotate an associated one of rollers 17 either clockwise or counterclockwise depending on the direction of rotation of the main drive motor 30.

As is illustrated in FIG. 2, main drive shaft 32 is coupled to sprocket 46 driving chain 36 through a normally deactivated electric clutch 47. It will therefore be evident that the pipe-rotating rollers 16 are rotated so long as the main motor is energized whereas the rotation of the translatory pipe feed rollers 17 is dependent on the energization of electric clutch 47. Means to be described presently safeguard against driving rollers 17 except while supporting the pipe out of contact with rollers 16.

Figure 4:
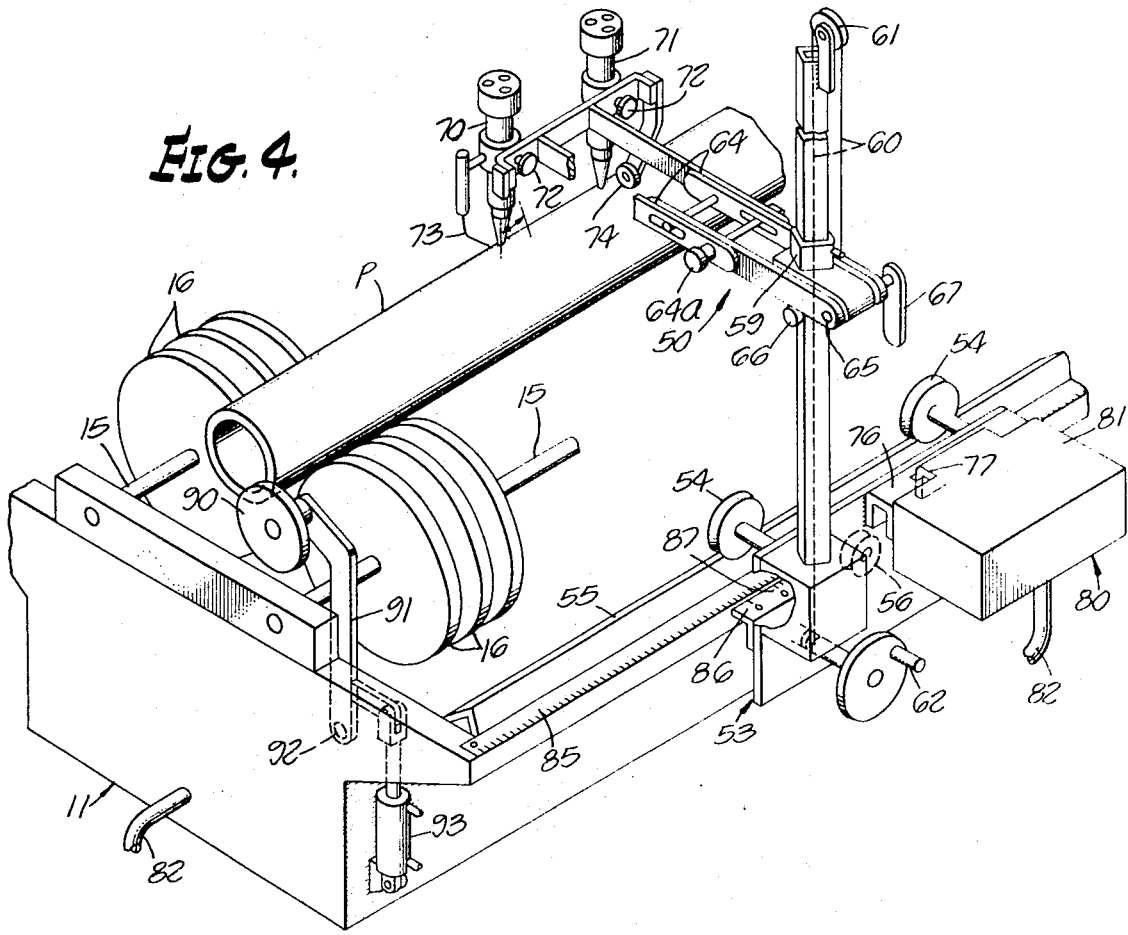
FIG. 4 is a fragmentary perspective view taken from the forward end of one cutting station and showing the power-operated pipe stop and details of the cutting torch assembly employed in making straight and bevelled cuts.

Referring to FIGS. 1 and 4, essential details and characteristics of the two slidably supported cutting torch assemblies 50 and 51 will be described. Each torch assembly is slidably supported along a respective side of main frame 11 on a separate carriage, torch assembly 50 being designed and equipped to make straight or bevelled cuts in a plane normal to the pipe axis, whereas torch assembly 51 is designed to make either straight or bevelled cuts conventionally known as mitered or contoured cuts. Each torch assembly operates in any selected cutting zone lengthwise of main frame 11.

As is best shown in FIG. 4, the straight cutting torch assembly 50 comprises a carriage 53 suspended along the outer side of main frame 11 on a pair of grooved rollers 54 riding on a V-shaped guide rail 55 fixed to the main frame. A cooperating guide roller 56 extending inwardly from carriage 53 rides in a companion guide rail supported along the underside of a shelflike portion of main frame 11 and similar in construction to guide rail 55. Fixed to carriage 53 is an upright noncircular tubular bracket 58 along which an antifriction assembly 59 is freely slidable under the control of a cable 60 having one end secured to assembly 59 and passing over a roller 61 mounted at the top of the bracket. Cable 60 passes downwardly through the bracket and is fixed to a winch drum mounted on the spindle of a handcrank 62 journaled in carriage 63. A suitable clamp, not shown, for the winch can be tightened to lock the winch and assembly 59 in any adjusted position along bracket 58. A torch-supporting bracket 64 is adjustable in length to support the cutting torch most advantageously and is clampable in a selected adjusted position by clamping knob 64a. Bracket 64 is pivotally connected to assembly 59 by an eccentric 65 provided with an operating handle 67. The lower edges of bracket arms 64 forwardly of eccentric 65 rest against a stop pin 66 projecting from the opposite sides of assembly 59. Eccentric 65 provides an easily regulated adjustment for pivoting the torch-supporting bracket 64 toward and away from the pipe being cut in a manner to leave the blowhole in an area normally cut out when making a bevel cut. Additionally these cams enable the operator to raise the torches quickly to an elevated position if this is desirable while feeding the pipe forwardly or backwardly. Crank 62 for the cable winch is also usable for this purpose but is primarily employed to provide a coarse adjustment of the torches in contrast to the fine adjustment provided by eccentric 66 and its control handle 67.

Pivotally secured to the outer end of bracket 64 are a pair of conventional flame cutting torches 70, 71 each equipped with flexible hoses for supplying fuel and oxygen to the torches and understood as having independently regulatable controls conveniently located near the base of bracket 58. Torches 70 and 71 are clampable in a vertical cutting position by separate clamping screws 72. Preferably, torch 70 is pivotable between two stops one of which positions the torch in an upright position for straight cuts and the other of which positions the torch properly for bevel cuts. Each torch also includes a high tension igniter conductor 73 positioned to ignite the fuel issuing from the nozzle tip in accordance with customary practice. The torches also preferably include roller means 74 adjustable to support the nozzle tips a desired distance from the pipe and particularly useful in maintaining the nozzle in the most efficient cutting position when cutting nonround pipe.

An important feature of the torch assembly carriage 53 is the provision of a bracket 76 having a slot adapted to seat the downwardly curled lip of a mounting bracket 77 fixed to the adjacent sidewall of control console 80. The top panel 81 of this console will be understood as equipped with various control knobs and switches controlling the operation of the electrical and hydraulic components of cutting machine 10, and the significant details of which will be described presently. Each of the individual controls is connected electrically through a flexible cable 82 extending downwardly from the underside of console 80 and entering a centrally located portion of the machine, such as the front end wall of main frame 11. As long as the machine is being used to make straight cuts using torch assembly 50, control console 80 is supported on torch carriage 53 and is movable therewith along guide rails 55 to any selected cutting position. However, when the machine is being used to make contour cuts, the operator simply lifts the console upwardly to detach it from bracket 76 and carries it to a different operating position on the other side of the machine as will be described in connection with torch assembly 51.

Fixed to main frame 11, as beside the base of carriage guide rail 55, is measuring scale 85 having a zero point at its left-hand edge end laterally opposite a power-operated stop 90 for the pipe. Projecting inwardly from carriage 53 opposite the edge of scale 85 is a line 86 indicating to the operator when the carriage is properly positioned to utilize torch 70 to make a straight cut at a desired distance from the forward end of the pipe. Slightly to the left of indicator 86 on carriage 53 is a short scale 87 graduated in fractions of an inch and utilized by the operator in positioning the torch assembly to make a bevelled cut. The graduations of scale 87 are used in combination with scale 85 in setting the position of the torch assembly to cut pipe of different wall thicknesses. Thus in cutting pipe of greater thickness carriage 53 is shifted slightly further to the left than when cutting pipe of thinner wall thickness.

The power operated stop for pipe P used in properly positioning torch assembly 50 comprises a stop disc 90 mounted on one arm of a bellcrank 91 pivoted to the main frame by pivot pin 92. Bellcrank 91 is shifted between its extended position to stop pipe, as illustrated in FIG. 4, to a fully retracted position by a double action hydraulic cylinder 93 pivotally supported on frame 11.

Referring now to FIG. 1 it will be understood that the contour-cutting torch assembly 51 includes a cutting torch 95 having the same features as torches 70 and 71 and likewise adjustable supported directly over the pipe by a bracket 96 secured to a base member 97. The entire torch assembly, including its supporting base 97, is detachably clampable by clamping knob 99 between the opposite sides of a rigid rectangular carriage frame 98. Customarily, it is supported near the forward end of frame 98 but it may be shifted to an operating position anywhere therealong should this be desirable. The opposite longer sides of frame 98 comprises a pair of pipes each supported between pairs rollers bearing guide rollers 100 appropriately supported on the main frame of the machine and accurately controlling the reciprocal movement of frame 98 parallel to the axis of the pipe P. A lateral extension 102 of the main frame also supports a suitable geometric mechanism 104 operating in known manner to reciprocate carriage frame 98 and torch assembly 51 as desired to cut the pipe other than in a plane normal to its axis.

Although various geometric mechanisms may be employed for this purpose, the preferred mechanism is that disclosed in U.S. Pat. 3,430,938 granted Mar. 4, 1969 to Marvin Blackburn. As is disclosed in that patent, the various adjustments and regulatable components of the geometric contour generating mechanism are disposed vertically whereas in the present disclosure it will be understood that all scales and adjustments are disposed horizontally for greater convenience and in viewing, checking and setting the components.

Referring to FIG. 2, it is pointed out that the drive connection to contour mechanism 104 is directly to the outer end of the main drive shaft 32 for the pipe rotating rollers 16, 16. This drive connection includes any selected pair of easily installed mating drive gears 106, 107, one typical set of which correspond, respectively, with gears 35, 36 of the Blackburn patent. The output drive connection between mechanism 104 and the torch reciprocating assembly includes crank arm 108 having its outer end connected to frame 98 through a clamping nut 109 and a bracket member 110 clampable to frame 98 either forwardly or rearwardly of the contour drive mechanism to provide either a negative or a positive corrective factor to the cutting torch assembly 51. Inasmuch as these details are fully explained in the Blackburn patent and do not form a novel feature of the present invention, further elaboration herein is unnecessary.

CLASSIFYING CONVEYOR

Referring to FIGS. 1 and 5, it will be recognized that the delivery and classifying conveyor assembly 13 has a long main frame 115 resting on the ground and provided at intervals centrally along its top edge with upwardly extending brackets 116 supporting pivot pins 117 extending lengthwise of the conveyor. The conveyor proper comprises a rigid frame formed by a pair of outwardly facing channel members 120, 120 rigidly interconnected at intervals by transverse spacer bars 121. The midportions of these spacer bars are fixed to an associated one of pivot pins 117 journaled in brackets 116.

Normally the conveyor frame 120 is held firmly in a level operating position by a hydraulic power cylinder 123 having its lower end pivoted to main frame 115 by a pivot pin 124 and the outer end of its piston rod connected to one of the conveyor frame members 120 by pivot pin 125. Cylinder 123 is operable by means to be described presently to tilt the conveyor to the right or to the left to deposit cut pipe in a selected area.

Rotatably supported between the conveyor side frames are a plurality of pipe-conveying rollers 17' some of which are idler rollers and other of which are interconnected by drive chain 127 passing over sprocket wheels connected with roller 17' and in mesh with sprockets supported on a drive shaft 128. The latter shaft is driven through gear reduction 129 and a reversible conveyor drive motor 130.

Fixed to the conveyor main frame 115 of the main conveyor are a pair of normally open microswitches 132, 133 having cam follower rollers positioned to be contacted by an associated one of cams 134, 135 fixed to shaft pin 117 and tilting with conveyor 120 about the axis of pin 117. Cam 134 operates to close microswitch 132 upon slight tilting of the conveyor to the right whereas microswitch 133 closes as the conveyor begins to tilt to the left from its normally level condition. These switches are employed as an important part of automatic means for restoring the conveyor to a level position as soon as the machine operator opens a switch 165 to initiate tilting of the conveyor to discharge pipe.

CONTROL CONSOLE AND OPERATION

Control console 80 is electrically connected to the electrical components and hydraulic components through flexible cabling 82, the various components being electrically connected as illustrated schematically in FIG. 6. The machine is powered from an alternating current source through suitable protective fusing and a master control switch 140 shown at the left hand end of the schematic. The reversible conveyor drive motor 130 is connected across the AC power lead through a reversing switch 142 mounted on console 80. The main drive motor 30 for the cutting machine is of any conventional variable speed reversible DC type having its own power supply connected across the AC supply and operating to provide the DC requirements for the motor. The control switch 143 therefor is likewise mounted on the console and controls the direction of rotation while a control knob connected to the variable contact 145 of voltage divider 146 is employed to control its speed over a suitable operating range.

A master control switch 148 on the control panel of the console controls the power supply required for the operation of the straight cutting torch assembly 50 and a similar switch 149 controls the power supply governing the operation of the pantograph or contour-cutting torch assembly 51.

It will be understood that each of the torches 70, 71 includes a first group of independently operable switches effective when master switch 148 is closed to energize separate solenoid valves to supply oxygen at a high or a low rate, suitable fuel such as acetylene, as well as a switch for energizing an igniter 73 for the torches 70, 71. Likewise the contour-cutting torch assembly 51 has a second and similar set of switches controlling the operation of that torch whenever master switch 149 for that torch is closed.

The control circuit also includes controls for the hydraulic pump motor unit 160 having its power supply governed by relay R1 whenever master switch 161 for that motor is closed. The power supply for relay R1 is selectively controllable by any one of three double throw switches 163, 164, 165 each controlling an associated four-way valve for one of the hydraulic system motors. The four-way valves are not shown but will be understood as of conventional self-centering type when their operating solenoids are deenergized. Thus each valve includes a separate solenoid for holding the valve shifted to the right or to the left to supply pressurized fluid to one or the other end of the hydraulic motor controlled thereby. Only the solenoids for the three four-way valves are shown in the schematic.

Cylinder 93 (FIG. 4) for operating pipe stop 90 is controlled by a four-way valve shiftable to its stop "extending" position by solenoid 163L and to its stop "rectracting" position by solenoid 163R.

Power cylinder 25 (FIG. 2) for raising and lowering the pipe is controlled by a four-way valve activated to its pipe "raising" position by solenoid 164R and to its pipe "lowering" position by solenoid 164L.

Power cylinder 123 for tilting conveyor 13 is operable to tilt the conveyor to the left by operating switch 165 to energize solenoid 165A and to the right by operating switch 165 in the opposite direction to energize solenoid 165B. One blade of each of switches 163, 164, 165 operates to control the solenoids whereas the other blade of the switch is used to complete a power circuit to relay R1 thereby to energize hydraulic pump motor 160 operating in known manner to supply pressurized fluid to any of the power cylinders then in use.

The mode of operating the three hydraulic cylinders will now be described beginning with power cylinder 93 for pipe stop 90. As is best shown in FIG. 4, this stop is positioned to stop the forward end of the pipe directly opposite the "zero" mark on the graduated scale 85. After the operator has finished making a cut in the pipe, stop 90 can be pivoted counterclockwise about pivot 92 to its retracted position so that the pipe can be shifted forwardly onto conveyor 13 by closing switch 163 to energize solenoid 163R. Closing of the switch in this direction also energizes relay R1 to start pump motor 160 to supply pressurized fluid to the upper end of cylinder 93 as other fluid is released from its lower end for return to the fluid supply reservoir. As soon as stop 90 has been moved to its retracted position out of the path of the pipe, the operator returns stop control switch 163 to its normal open position.

Thereafter the pipe can be power shifted forwardly by closing the "lifter" control switch 164 controlling the pipe raising power cylinder 25 (FIG. 2) to energize solenoid coil 164R to supply pressurized fluid to the right-hand end of cylinder 25 as viewed in FIG. 2. This cylinder then pivots lever 27 clockwise to swing each of the brackets 18 for the pipe-raising rollers 17 toward their upright position. As the pipe approaches this position, microswitch 175 in the path of brackets 18 is closed to arm the power circuit of clutch 47 (FIG. 6). The pipe having been raised, the operator opens switch 164, thereby centering the four-way valve to lock the pipe in raised position, and then closes master switch 143 for motor 30 in one direction or the other depending upon the direction in which it is desired to shift the pipe. The power drive having been energized, the operator then closes control switch 176 for clutch 47 to activate the power drive for rollers 17 to rotate these rollers in the selected direction from power supply from motor 30. The speed of pipe movement is controlled by regulating speed control knob 145 for motor 30.

When the pipe has been positioned as desired with or without the aid of stop 90, the operator opens the clutch control switch 176. The pipe is then restored to support by rollers 16 by closing switch 164 to energize solenoid coil 164L and operating cylinder 25 in the opposite direction. Before the pipe can come in contact with the rollers 16 which are normally being rotated by motor 30, switch 175 opens to assure that the clutch is deenergized thereby safeguarding against the possibility of the pipe being lowered into contact with rollers 16 while the latter are rotating as well as to place rollers 17 in a free wheel condition when being lowered.

A piece of cut pipe can be carried away from the cutting station by first delivering the cut pipe onto conveyor 13 using the described pipe-shifting controls, and thereafter controlling the latter conveyor in a manner to discharge the pipe in any desired area as will now be described. Conveyor motor 130 is activated to convey pipe forwardly from the discharge end of the cutting machine by closing its control switch 142 on the operator's console. As the pipe approaches the desired storage area lengthwise of the conveyor, the operator closes switch 165 controlling the operation of the conveyor tilting cylinder 123 (FIG. 5) in one direction or the other. Assuming that the operator wishes to dump the pipe to the left of the conveyor, he closes switch 165 upwardly to energize solenoid 165a. At the same time the lower switch 165 closes to complete a power circuit to relay R2 thereby reversing the position of the three contacts of that relay. The closing of the upper contact of relay R2 completes a power circuit to relay R1 to start pump motor 160 to supply fluid to the conveyor tilt cylinder 123. The operator holds switch 165 closed until the conveyor tilts sufficiently to discharge the pipe to the left. As soon as the conveyor starts to tilt from level position, cam 134 tilting therewith operates to close microswitch 132 thereby arming a power circuit to solenoid coil 165B for power cylinder 123. However, this solenoid cannot be energized until relay R2 is deenergized because the two lower contacts of R2 are now open.

As soon as the pipe has been discharged and the operator has opened switch 165, relay R2 is deenergized thereby closing its middle contact to energize solenoid 165D to return the conveyor to a level condition at which time cam 134 opens switch 132 to deenergize solenoid 165D thereby locking cylinder 123 in a position to hold the conveyor level.

The tilting mechanism operates in precisely the same manner to discharge pipe to the right, it being understood that switch 165 is then operated in the reverse direction whereupon microswitch 133 is then automatically activated by the tilt of the conveyor to arm a circuit energizing coil 165A in a manner to return the conveyor to a level condition after the pipe has been discharged.

While the particular universal pipe cutting and handling machine herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as indicated in the appended claims.

We claim:

1. A pipe-cutting machine operable by one man from a control station comprising: an elongated main frame equipped with power means for shifting pipe axially therealong and past a cutting station, power means for rotating pipe about the axis thereof while being cut, cutting torch means including means for supporting said torch means for translatory movement lengthwise of the pipe to any selected cutting position therealong, and a control station adjacent said cutting station having operating controls and connections to each of said power means which controls are selectively operable to control the axial and rotary movement of the pipe, and controls for initiating and regulating the operation of said cutting torch means positioned for manipulation by an operator stationed at said control station.

2. A pipe-cutting machine as defined in claim 1 characterized in that said power means for shifting pipe axially thereof comprises a plurality of power driven rollers extending crosswise of said main frame at spaced points therealong and including power means for raising and lowering the same into and out of position to support the pipe at an elevation out of contact with said means for rotating the pipe about its axis.

3. A pipe-cutting machine as defined in claim 2 characterized in the provision of a common prime mover for driving said means for rotating said pipe and said means for translating the same lengthwise thereof.

4. A pipe-cutting machine as defined in claim 2 characterized in that said power means for the translatory movement of the pipe includes control means at said control station operable to move the pipe in either direction at different selected speeds.

5. A pipe-cutting machine as defined in claim 2 characterized in that said power means for the translatory movement of the pipe includes controls means at said control station to move the pipe forwardly and rearwardly at the operator's election.

6. A pipe-cutting machine as defined in claim 1 characterized in the provision of power-operated stop means at the end of said cutting station movable into and out of the path of pipe while being advanced lengthwise of said main frame and into position for the next cutting operation.

7. A pipe-cutting machine as defined in claim 6 characterized in the provision of control means on said control station operatively connected to said power-operated stop means for controlling the position thereof relative to the path of the pipe.

8. A pipe-cutting machine as defined in claim 1 characterized in that said power means for rotating the pipe includes roller-equipped shafts parallel to one another lengthwise of said main frame cooperating to support and rotate the pipe, said power means for translatory movement of the pipe including a plurality of spaced-apart roller means supported between said roller-equipped shafts and including power means for moving the same in a vertical plane between a retracted position out of contact with pipe supported by said roller-equipped shafts and an extended position to raise the pipe out of driving relation with said roller-equipped shafts.

9. A pipe-cutting machine as defined in claim 8 characterized in the provision of flexible positive drive means interconnecting a plurality of said translatory roller means and operable to drive said roller means selectively either clockwise or counterclockwise in unison.

10. A pipe-cutting machine as defined in claim 9 characterized in that said flexible positive drive means for said translatory roller means includes clutch means and manually operable control means therefor on said control station for activating and deactivating said clutch means.

11. A pipe-cutting machine as defined in claim 10 characterized in that the control means for said clutch means includes control means automatically operable to deactivate the drive to said translatory roller means as the same move toward the retracted position thereof.

12. A pipe-cutting machine as defined in claim 8 characterized in that said means for raising and lowering said roller means includes hydraulic motor means mechanically connected to each of said plurality of roller means.

13. A pipe-cutting machine as defined in claim 1 characterized in that said control station is supported on and movable with said torch supporting means whereby the machine operator stationed thereat is positioned adjacent a cutting operation of said cutting torch means irrespective of where the same may be located lengthwise of the pipe.

14. A pipe-cutting machine as defined in claim 13 characterized in that said control station comprises a console detachable supported on said torch-supporting means and is readily movable therefrom to a selected different position without disturbing or interfering with the operability of the operating connections between said control console and the several means controlled thereby.

15. A pipe-cutting machine as defined in claim 1 characterized in that said machine includes elongated roller-equipped conveyor means for receiving cut pipe from the outlet end of said cutting station, means supporting said roller-equipped means for limiting tilting movement laterally thereof, power means operable to tilt said conveyor means sufficiently to discharge pipe therefrom, and manual control means for said last mentioned power means at said control station.

16. A pipe-cutting machine as defined in claim 15 characterized in that said power means is selectively operable to tilt said pipe conveyor means in either lateral direction at the option of the operator at said control station.

17. A pipe-cutting machine as defined in claim 15 characterized in the provision of power drive means for said conveyor rollers including control means therefor located at said control station.

18. A pipe-cutting machine as defined in claim 16 characterized in the provision of means for automatically restoring said pipe conveyor means to a level operating condition after the discharge of cut pipe therefrom.

19. A pipe mitering and bevelling machine operable under power controlled from a control console, said machine having an elongated main frame provided with first and second sets of power driven roller means respectively operable to rotate the pipe about its axis and to shift the pipe axially thereof while elevated out of contact with said first set of rollers, first and second means extending lengthwise of said main frame slidably supporting first and second pipe-cutting torch means, contour-generating mechanism operably interconnecting said first set of power-driven roller means and said second pipe-cutting torch means for guiding said second torch means to make a cut in the pipe of a selected type other than in a plane normal to the pipe axis, said first torch means being operable to straight- and bevel-cut pipe in a plane normal to the pipe axis, flexible cable drive means operatively interconnecting said torch means and the power drive for said sets of roller means, and means for supporting said control console selectively opposite either of said first and second sets of cutting torch means depending upon which of said sets of torch means is in use.

20. A pipe mitering and bevelling machine as defined in claim 19 characterized in the provision of means for detachably supporting said control console on at least one of said first and second slidably supported torch means.

21. A pipe mitering and bevelling machine as defined in claim 19 characterized in that said control console includes means for selectively controlling said second set of rollers to shift pipe axially in either direction at the operator's option.

22. A pipe mitering and bevelling machine as defined in claim 19 characterized in the provision of hydraulically powered means controllable from said control console to elevate said second set of roller means to raise pipe out of contact with said first set of roller means while being shifted axially.

23. A pipe mitering and bevelling machine as defined in claim 19 characterized in the provision of power operated stop means movable into and out of the path of pipe advancing past said control console, and control means at said control console for said power operated stop means.

24. A pipe mitering and bevelling machine as defined in claim 19 characterized in the provision of manually operable winch and cable means adjacent said control console for raising and lowering at least one set of said torch means relative to pipe to be cut.

25. A pipe mitering and bevelling machine as defined in claim 19 characterized in the provision of electrically controlled clutch means operable when energized to activate the power drive for said second set of rollers, and means operable to prevent energization of said clutch means unless the pipe is out of supporting contact with said first set of roller means.

26. A pipe mitering and bevelling machine as defined in claim 25 characterized in that said means for preventing energization of said clutch means includes manually operable switch means at said control console and switch means positioned to be operated in one direction when the pipe is moved away from said first roller means and in the opposite direction as the pipe is being lowered toward said first roller means.

27. A pipe mitering and bevelling machine as defined in claim 26 characterized in that said last mentioned switch means are in series with one another and with said clutch means.

28. A pipe mitering and bevelling machine as defined in claim 19 characterized in the provision of conveyor means forwardly of said sets of cutting torch means tiltable laterally thereof to discharge cut pipe at a selected station along the length thereof, and power operated means controllable from said control console for tilting said conveyor means.

29. A pipe mitering and bevelling machine as defined in claim 28 characterized in that said power operated conveyor tilting means includes means for restoring said conveyor means automatically to its normal pipe conveying position after the same has been tilted until pipe present thereon has been discharged from the side thereof.

30. A pipe mitering and bevelling machine as defined in claim 29 characterized in that said conveyor tilting means and the control therefor are selectively operable to tilt said conveyor means in either lateral direction at the option of the console operator.

31. A pipe-cutting machine as defined in claim 6 characterized in the provision of control means on said control station operatively connected to said power operated stop means for moving the same into the path of the pipe whereby the pipe may be power-advanced until engaging said stop thereby to locate the advance end of the pipe relative to the cutting station.